W. R. EVANS.
COLOR WHIRLIGIG.
APPLICATION FILED MAR. 5, 1908.
911,582. Patented Feb. 9, 1909.
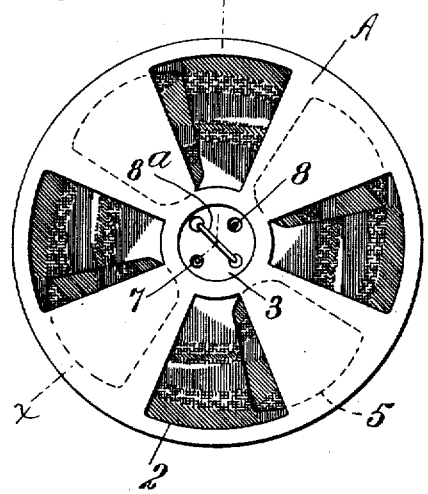
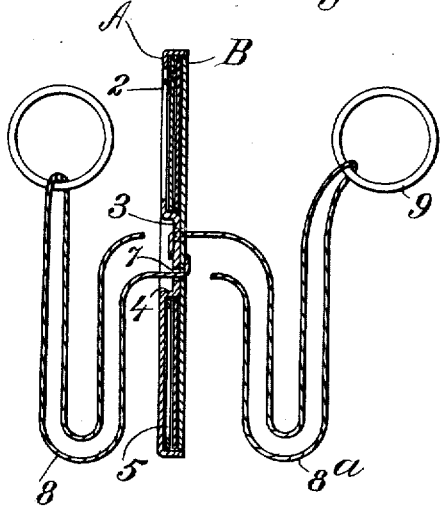
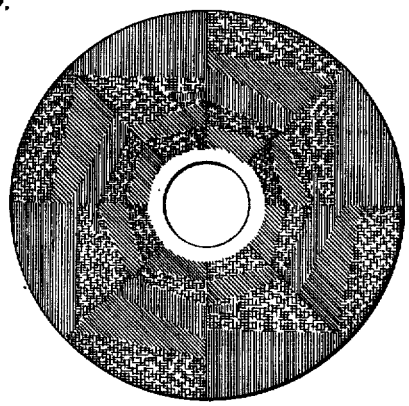
Witnesses
Alex Currie
J. R. Smee
Inventor
William R. Evans.
by
Geo. H. Strong.
Attorney

UNITED STATES PATENT OFFICE.

WILLIAM R. EVANS, OF SAN FRANCISCO, CALIFORNIA.

COLOR-WHIRLIGIG.

No. 911,582.　　　　Specification of Letters Patent.　　　　Patented Feb. 9, 1909.

Application filed March 5, 1908.　Serial No. 419,347.

*To all whom it may concern:*

Be it known that I, WILLIAM R. EVANS, a citizen of the United States, residing at the city and county of San Francisco and State of California, have invented new and useful Improvements in Color-Whirligigs, of which the following is a specification.

My invention relates to a device which I call a "color whirligig", and it consists of the parts and the construction and combination of parts forming the improved device which I will hereinafter describe and claim.

Referring to the accompanying drawings for a more complete explanation of my invention—Figure 1 is a front view illustrating my device. Fig. 2 is a sectional view taken through the axis on line X—X, Fig. 1. Fig. 3 is a front view of one of the colored disks.

Various revoluble devices showing combinations of colors have been heretofore constructed.

My device is designed to provide a toy in which the combinations of colors are constantly changed by a novel arrangement of the disks and the colors thereon.

In the present case, I have shown two disks A and B, which may be made of metal or other material of sufficient weight, so that an impulse being given, they will revolve upon their axes under the momentum of their initial power and speed. One or both of these disks may be perforated with openings. In the present case, I have shown four of these openings 2, made with radially divergent sides and concentric outer and inner edges, so that the openings are in the form of segments. One of these disks has fixed to it a hub 3, with a flange, as at 4, which serves as a support for colored disks which are placed intermediate between the disks A and B. The central holes of these colored disks are of sufficient diameter to allow said disks to turn easily upon the hub and to constantly change their relative position. If only one of said disks is employed, the change in colors and combinations will be dependent upon the number and arrangement of the colors upon said disk. If more than one of said disks be employed, the innermost one may be a continuous disk bearing the desired colors. The disks exterior to it may have openings cut in them, as shown at 5, these openings being similar in shape to those described for the outer disks; and the intermediate portions of such disks may also be painted or otherwise colored variously, so that as the perforated disks turn, with relation to the interior ones, different colors on the interior ones will be exposed, which combining with the constantly changing ones of the exterior disks, will produce various and changing combinations, by reason of the fact that the impression of one rapidly moving color will remain upon the retina of the eye until another color is impressed thereon; and the combinations will cause the various well known spectrum changes caused by such action. In order to obtain the greatest variety and combinations of such colors, I have shown the colors as being irregularly disposed upon the disks, and segments thereof; some of the colors being convergent or divergent for a certain distance on certain portions of the disks and concentric with the axes thereof, others being made diagonal, with one end nearer the periphery than the other, and others being enlarged from a narrow to a wide end and diagonal with concentric lines, so that the greatest variety may be obtained.

In order to properly hold the parts of the device together, and particularly to prevent it slipping from one end to the other of the operating cords 6, I have shown the hub 3 having holes made in it, as at 7. The string or cord 8 from one side extends through two of these holes, its bight crossing the opposite side of the disk, and the two ends of the string being attached to a button, ring, or other device by which they may be held. The other cord 8ª is in the same manner passed through the other pair of holes at right angles with the first-named pair, its bight crossing the outside of the hub of the opposite disk, and in like manner the ends of the strings having a holding attachment, as at 9; so that when the device is rotated, the strings being twisted upon each other when rotated in one direction, will be untwisted by the pull upon the strings, and thus transmit a rapid rotary motion to the disks; the outer disks partaking of the motion transmitted through the strings, and the inner ones turning loosely upon the hub being capable of constantly changing their positions relative to each other, and relative to the openings in the exterior disks.

The crossing of the two independent strings upon opposite sides of the hub will, by reason of the bights of the strings, always maintain the revoluble device centrally between the ends of the strings, and the strings may be held vertically or in a horizontal or diagonal position without allowing the disks to slip downward toward either end by gravitation.

The radial sections upon the disks may be disposed in pairs, there being as many as may be found desirable, and the colors upon each of the plurality of sections which carry one design must be alike; those of the intermediate sections being also alike, although differing from those of the first-named sections. This is necessary to produce the required combinations.

Having thus described my invention, what I claim and desire to secure by Letters Patent is—

An improved toy of the character described consisting of a pair of disks one of which is provided with segmental openings. one of said disks having a hub fixed to it and having a flanged offset from the hub and adapted to form a support, colored disks placed intermediate between the first-named disks and turnable freely upon the hub-portion, said hub-portion being provided with two sets of holes, and means for holding the disks together, said means consisting of a cord extending from one side through two of said holes and having its bight crossing the opposite side of one of the disks, and a second cord passing through the other pair of holes in the hub at right-angles with the first-named pair, and having its bight crossing the outside of the hub of the opposite disk, and holding attachments at opposite ends of the cords.

In testimony whereof I have hereunto set my hand in presence of two subscribing witnesses.

WILLIAM R. EVANS.

Witnesses:
  GEO. H. STRONG,
  CHARLES A. PENFIELD.